US011675233B2

(12) United States Patent
Mizusaki et al.

(10) Patent No.: US 11,675,233 B2
(45) Date of Patent: Jun. 13, 2023

(54) LIQUID CRYSTAL DISPLAY DEVICE AND PRODUCTION METHOD FOR LIQUID CRYSTAL DISPLAY DEVICE

(71) Applicant: SHARP KABUSHIKI KAISHA, Sakai (JP)

(72) Inventors: Masanobu Mizusaki, Osaka (JP); Yuichi Kawahira, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 832 days.

(21) Appl. No.: 16/498,274

(22) PCT Filed: Mar. 22, 2018

(86) PCT No.: PCT/JP2018/011316
§ 371 (c)(1),
(2) Date: Jan. 13, 2020

(87) PCT Pub. No.: WO2018/180851
PCT Pub. Date: Oct. 4, 2018

(65) Prior Publication Data
US 2020/0192139 A1   Jun. 18, 2020

(30) Foreign Application Priority Data
Mar. 28, 2017   (JP) .............................. JP2017-063064

(51) Int. Cl.
*G02F 1/13363* (2006.01)
*G02F 1/1337* (2006.01)
(Continued)

(52) U.S. Cl.
CPC .......... *G02F 1/13363* (2013.01); *C08F 22/26* (2013.01); *C08F 22/38* (2013.01);
(Continued)

(58) Field of Classification Search
CPC .... B32B 2457/202; C08F 22/26; C08F 22/38; C08F 22/385; C08F 222/102;
(Continued)

(56) References Cited

U.S. PATENT DOCUMENTS 10,824,014 B2 * 11/2020 Mizusaki ............ G02F 1/13363
10,831,065 B2 * 11/2020 Mizusaki ............... C09K 19/22
(Continued)

FOREIGN PATENT DOCUMENTS

JP   2007-304151 A   11/2007
JP   2015-230347 A   12/2015
(Continued)

OTHER PUBLICATIONS

Seiberle et al., Volume Photo-Aligned Retarders, Nov. 2007, IEICE Trans. Electron., vol. E90-C, No. 11, pp. 2088-2093.*
H. Seiberle et al., "Volume Photo-Aligned Retarders", IDW06, FMC2-1, Rolic Technologies, Gewerbestrasse 18, 4123 Allschwil, Switzerland, p. 303-306.
(Continued)

*Primary Examiner* — Eli D. Strah
(74) *Attorney, Agent, or Firm* — ScienBiziP, P.C.

(57) ABSTRACT

The present, invention provides a liquid crystal display device that can exhibit excellent retardation stability against heat and that can prevent reduction in contrast ratio due to scattering even when the liquid crystal display device includes a retardation layer formed by polymerization of a reactive monomer, and a method for producing a liquid crystal display device suitable for production of the liquid crystal display device. The liquid crystal display device of the present invention includes paired substrates and a liquid crystal layer provided between the paired substrates. At least one of the paired substrates includes a retardation layer formed from a polymer of at least one type of monomer. The at least one type of monomer includes a photo-aligning monomer that is to be aligned by polarized light.

8 Claims, 3 Drawing Sheets

(51) Int. Cl.
*C09K 19/56* (2006.01)
*C08F 22/26* (2006.01)
*C08F 22/38* (2006.01)

(52) U.S. Cl.
CPC .......... *C08F 22/385* (2013.01); *C09K 19/56* (2013.01); *G02F 1/133723* (2013.01); *G02F 1/133788* (2013.01); *B32B 2457/202* (2013.01); *C09K 2323/02* (2020.08); *C09K 2323/035* (2020.08); *G02F 1/133638* (2021.01); *G02F 1/133715* (2021.01)

(58) Field of Classification Search
CPC .......... C08F 222/1025; C08F 222/385; C09K 19/2014; C09K 19/56; C09K 2019/0448; C09K 2323/02; C09K 2323/035; G02B 5/30; G02F 1/133565; G02F 1/13363; G02F 1/133635; G02F 1/133638; G02F 1/133715; G02F 1/133723; G02F 1/133784; G02F 1/133788; G02F 2413/01; G02F 2413/05
See application file for complete search history.

(56) References Cited

U.S. PATENT DOCUMENTS

| | | | |
|---|---|---|---|
| 2005/0195349 A1* | 9/2005 | Shin | G02F 1/133753 349/124 |
| 2008/0174722 A1* | 7/2008 | Ohyama | G02F 1/133632 349/75 |
| 2009/0079913 A1* | 3/2009 | Nishikawa | G02B 5/3083 359/885 |
| 2013/0271713 A1* | 10/2013 | Miyake | G02F 1/133711 349/124 |
| 2015/0260903 A1 | 9/2015 | Kashima et al. | |
| 2018/0113337 A1 | 4/2018 | Mizusaki | |

FOREIGN PATENT DOCUMENTS

| | | |
|---|---|---|
| JP | 2016-014789 A | 1/2016 |
| WO | 2016/148041 A1 | 9/2016 |

OTHER PUBLICATIONS

Hubert Seiberle et al., "Volume Photo-Aligned Retarders", IEICE Trans. Electron., Nov. 2007, pp. 2088-2093, vol. E90-C, No. 11.

* cited by examiner (a)

(b)

(a)

(b)

(c)

LIQUID CRYSTAL DISPLAY DEVICE AND PRODUCTION METHOD FOR LIQUID CRYSTAL DISPLAY DEVICE

TECHNICAL FIELD

The present Invention relates to liquid crystal display devices and methods for producing a liquid crystal display device. The present invention specifically relates to a liquid crystal display device including a retardation layer in a liquid crystal panel and a method for producing a liquid crystal display device.

BACKGROUND ART

Methods of forming a retardation layer in a liquid crystal panel have recently been studied. For example, a known method is such that a reactive monomer aligned by an alignment layer is polymerized to provide a retardation layer. With regard to this method. Patent Literature 1 discloses a composition for a photo-alignment film containing an organic solvent and a polymer obtained by polymerizing a compound containing two or more azide groups and a compound containing two or more (meth)acryl groups.

CITATION LIST

Patent Literature

Patent Literature 1: JP 2016-14789 A

SUMMARY OF INVENTION

Technical Problem

In order to achieve clear recognition of display even under external light (in a bright place), the present inventors examined a method of forming a retardation layer in a liquid crystal panel. FIG. 4 is a schematic cross-sectional view of an exemplary structure of a liquid crystal panel including a retardation layer formed by a conventional method using an alignment layer. As illustrated in FIG. 4, the liquid crystal display device including a retardation layer in a liquid crystal panel formed by a conventional method using an alignment layer includes, from the viewing aide to the back side, a first linear polarizer 11, a transparent substrate 21, a color filter/black matrix layer 22, an alignment layer 101, an in-cell retardation layer 102, an alignment film 103, a liquid crystal layer 30, an alignment film 41, a thin-film transistor (TFT) substrate 42, and a second linear polarizer 51.

The in-cell retardation layer 102 illustrated in FIG. 4 is formed by a method illustrated in FIG. 5. FIG. 5 includes diagrams illustrating a method for forming the in-cell retardation layer 102 using the alignment, layer 101. First, as illustrated in FIG. 5(a), the alignment layer 101 formed on the color filter/black matrix layer 22 is subjected to an alignment treatment by rubbing or light irradiation. The alignment layer 101 is usually formed from polyimide (polyamic acid), for example. Then, as illustrated in FIG. 5(b), a solution containing a reactive monomer is applied to the alignment layer 101. Thereby, a film 102a containing the reactive monomer is formed. Finally, the film 102a is heated, so that the reactive monomer is polymerized and the film 102a is cured. Thereby, the in-cell retardation layer 102 illustrated in FIG. 5(c) is obtained.

Studies performed by the present inventors demonstrate that the in-cell retardation layer 102 formed using the alignment layer 101 as described above may involve relatively poor alignment of the reactive monomer, resulting in poor thermal stability and occurrence of scattering due to the following reasons.

(1) A conventional reactive monomer is to be aligned by the alignment treatment with the alignment layer 101. Thus, the reactive monomer itself cannot induce alignment.

(2) The alignment layer 101 can be formed only on one side of the film containing the reactive monomer, and thus the alignment, layer 101 has an insufficient alignment regulating force. A reactive monomer-containing film 102a having a thickness of about 1 mm exhibits poor alignment and high randomness of the reactive monomer.

(3) Such poor alignment and high randomness of the reactive monomer causes poor thermal stability. In other words, the energy of the reactive monomer to be random by heat, surpasses the energy of the reactive monomer to be stable in alignment, resulting in much poor alignment of the reactive monomer. Accordingly, the retardation of the in-cell retardation layer 102 obtained by polymerizing the reactive monomer may be reduced by baking in formation of the alignment, film or may be changed (reduced) after long-term use.

(4) Such poor alignment of the reactive monomer easily causes scattering on the in-cell retardation layer 102, resulting in poor contrast ratio of the liquid crystal display device.

When the alignment, layer 101 is subjected to an alignment treatment, by rubbing, the reactive monomer is made to have a pre-tilt angle of at least about 1°. This may cause insufficient retardation of the in-cell retardation layer 102 or viewing angle dependence of the retardation.

When the alignment layer 101 is subjected to an alignment treatment by light, irradiation, the alignment regulating force on the in-cell retardation layer 102 is weak, and the alignment and retardation of the in-cell retardation layer 102 are deteriorated with time. Accordingly, the functions of the in-cell retardation layer 102 may become insufficient after long-term use.

In response to the above issues, the present invention aims to provide a liquid crystal display device that can exhibit excellent retardation stability against heat and that can prevent reduction in contrast ratio due to scattering even when the liquid crystal display device includes a retardation layer formed by polymerization of a reactive monomer, and a method for producing a liquid crystal display device suitable for production of the liquid crystal display device.

Solution to Problem

The present inventors performed various studies on methods of forming a retardation layer in a liquid crystal panel, and focused on the fact that the use of a cured product of a conventional reactive monomer caused insufficient retardation stability against heat and reduction in contrast ratio due to scattering. Then, the present inventors found that the use of a photo-aligning monomer that is to be aligned by polarized light can improve the alignment of the reactive monomer. Thereby, the present inventors have arrived at the solution to the above issues, completing the present invention.

Specifically, an aspect of the present invention is a liquid crystal display device including: paired substrates; and a liquid crystal layer provided between the paired substrates, at least one of the paired substrates including a retardation layer formed from a polymer of at least one type of monomer, the at least one type of monomer including a photo-aligning monomer that is to be aligned by polarized light.

Another aspect of the present invention is a method for producing a liquid crystal display device that includes a liquid crystal layer and a substrate including a retardation layer, the method including:

forming a film containing at least one type of monomer, the at least one type of monomer including a photo-aligning monomer represented by the following formula (I):

[Chem. 1]

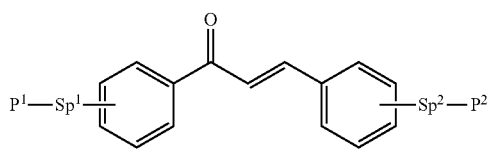

wherein $P^1$ and $P^2$ are the same as or different from each other, and are each an acryloyloxy group, a methacryloyloxy group, an acryloylamino group, a methacryloylamino group, a vinyl group, or a vinyloxy group; and $Sp^1$ and $Sp^2$ are the same as or different from each other, and are each a C1-C6 linear, branched, or cyclic alkylene group, a C1-C6 linear, branched, or cyclic alkyleneoxy group, a C1-C6 linear, branched, or cyclic alkyleneamino group, or a direct bond; and irradiating the film with polarized light to polymerize and align the monomer to form the retardation layer.

Advantageous Effects of Invention

The present invention can provide a liquid crystal display device that can exhibit excellent retardation stability against heat and can prevent reduction in contrast ratio due to scattering even when the liquid crystal display device includes a retardation layer formed by polymerization of the reactive monomer.

DESCRIPTION OF EMBODIMENTS

Embodiments are described hereinbelow and thereby the present invention is described in detail with reference to the drawings. Still, these embodiments are not intended to limit the present invention. The structures of the embodiments may be combined or modified as appropriate within the spirit of the present invention.

In the description, the terra "viewing side" means the side close to the screen (display surface) of the display device, while the term "back side" means the side remote from the screen (display surface) of the display device.

In the description, the term "retardation layer" means a retardation layer that gives an in-plane retardation of 10 nm or greater to at least light at a wavelength of 550 nm. The light at a wavelength of 550 nm is light, at the wavelength to which a human has the highest luminosity factor. The in-plane retardation is defined by $R=(ns-nf) \times d$. In the formula, ns is the greater one of the in-plane principal refractive indices nx and ny of the retardation layer, and nf is the smaller one of the in-plane principal refractive indices nx and ny of the retardation layer. The principal refractive indices indicate the values against light at a wavelength of 550 nm, unless otherwise mentioned. The in-plane slow axis of a retardation layer indicates the axis in the direction corresponding to ns, and the in-plane fast axis indicates the axis in the direction corresponding to nf. In the formula, d is the thickness of a retardation layer, in the description, the term "retardation" means the in-plane retardation against light at a wavelength of 550 nm, unless otherwise mentioned.

In the description, the term "in-cell retardation layer" means a retardation layer that is provided closer to the back side than the viewing-side transparent substrate of the liquid crystal panel is.

Embodiment 1

Figure 1:
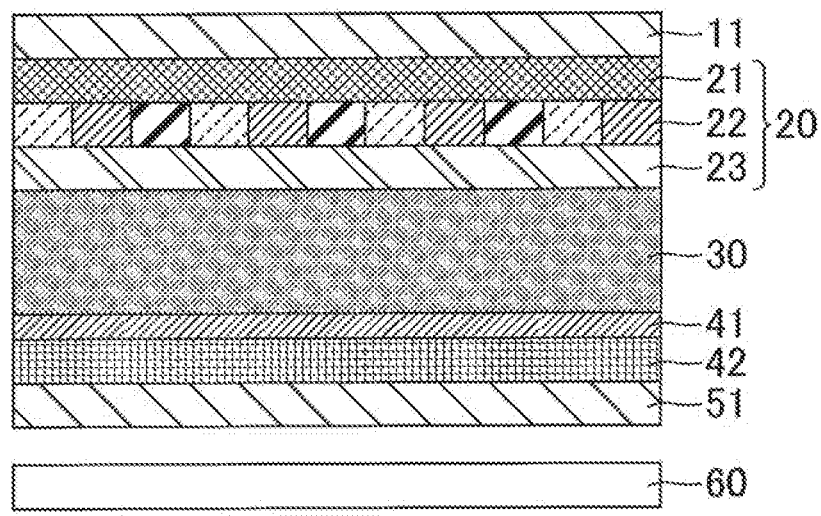
FIG. 1 is a schematic cross-sectional view of a structure of a liquid crystal display device of Embodiment 1.

FIG. 1 is a schematic cross-sectional view of a structure of a liquid crystal display device of Embodiment 1. As illustrated in FIG. 1, the liquid crystal display device of Embodiment 1 includes, from the viewing side to the back side, a first linear polarizer 11, a color filter (CF) substrate 20, a liquid crystal layer 30, an alignment film 41, a thin-film transistor (TFT) substrate 42, a second linear polarizer 51, and a backlight 60.

The first linear polarizer 11 may be a polarizer (absorptive polarizer) obtained by dyeing a polyvinyl alcohol (PVA) film with an anisotropic material such as an iodine complex (or a dye) to adsorb the anisotropic material on the polyvinyl alcohol film, and then stretching the film for alignment, for example. In order to ensure mechanical strength and wet and heat resistance, each surface of the PVA film is usually provided with a protecting film such as a triacetyl cellulose (TAG) film before practical use.

The CF substrate 20 includes, from the viewing side to the back side, a transparent substrate 21, the color filter/black matrix layer 22, and an in-cell retardation layer 23.

The transparent substrate 21 may be, for example, a glass substrate or a plastic substrate.

The color filter/black matrix layer 22 has a structure in which red color filters, green color filters, and blue color filters are arranged in the plane and are partitioned by a black matrix. The red color filters, green color filters, blue color filters, and black matrix each may be formed from a transparent resin containing a pigment. Every pixel is usually provided with a combination of a red color filter, a green color filter, and a blue color filter. Mixing the colors while controlling the amounts of colored light passing through the red color filter, the green color filter, and the blue color filter can give a desired color in each pixel.

The in-cell retardation layer 23 is formed from a polymer of at least one type of monomer. A preferred monomer to be a material of the polymer is a reactive mesogen (RM) monomer that is a reactive monomer containing a mesogen site in the molecule. At least one of the types of the monomers to be materials of the polymer is a photo-aligning monomer that is to be aligned by polarized light. The photo-aligning monomer is to be aligned along the direction of polarized light. Thus, the photo-aligning monomer can be uniformly aligned in the thickness direction of the in-cell retardation layer 23 regardless of the thickness of the in-cell retardation layer 23. In this case, the alignment of the retardation layer in the whole layer can be better than in a conventional case of controlling the alignment with an alignment, layer provided only on one side of the retardation layer. This can improve the retardation stability; specifically, the retardation is less likely to change even after long-term use and is also more stable against heat. Such better alignment of the retardation layer in the whole layer can reduce a decrease in contrast ratio due to scattering.

The photo-aligning monomer is preferably a radical polymerizable monomer containing a photo-reactive group, more preferably a radical polymerizable monomer containing a chalconyl group as a photo-reactive group. The radical polymerizable monomer containing a chalconyl group is preferably a monomer represented by the following formula (I):

[Chem. 2]

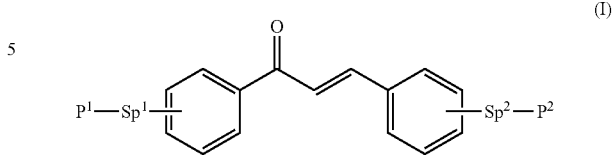

wherein $P^1$ and $P^2$ are the sane as or different from each other, and are each an acryloyloxy group, a methacryloyloxy group, an acryloylamino group, a methacryloylamino group, a vinyl group, or a vinyloxy group; and $Sp^1$ and $Sp^2$ are the same as or different from each other, and are each a C1-C6 linear, branched, or cyclic alkylene group, a C1-C6 linear, branched, or cyclic alkyleneoxy group, a C1-C6 linear, branched, or cyclic alkyleneamino group, or a direct bond.

The photo-aligning monomer preferably contains at least one of an amide group (—NH—) and/or an amino group (—CONH—). The presence of an amino group and/or an amide group in the monomer molecule can induce a hydrogen bond between the molecules, improving the thermal stability. Examples of hydrogen bonds induced between the molecules include the following.

[Chem. 3]

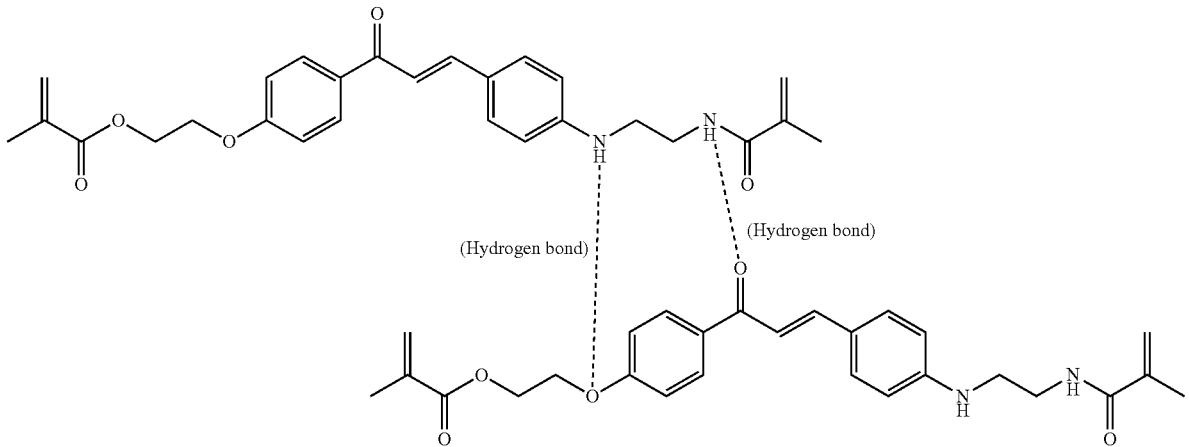

Specific examples of a preferred monomer containing at least, one of an amide group and/or an amino group among the monomers represented by the formula (I) include those represented by the following formula (I-1), (I-2), (I-3), (I-4), (I-5), (I-6), (I-7), (I-8), (I-9), (I-10), (I-11), or (I-12).

[Chem. 4]

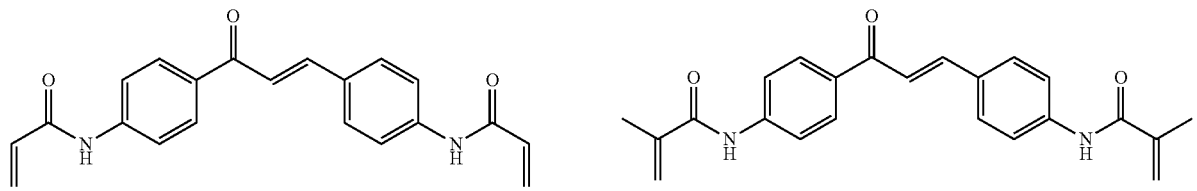

-continued
(I-3)
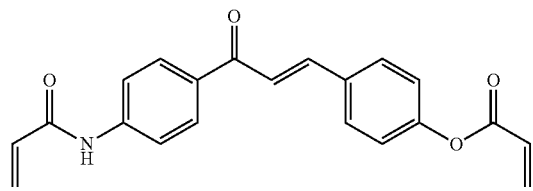
(I-4)
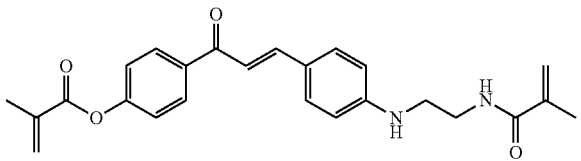
(I-5)
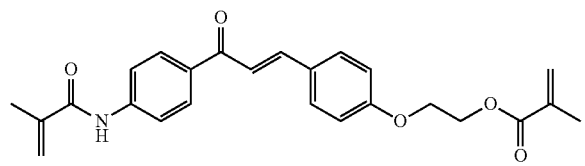
(I-6)
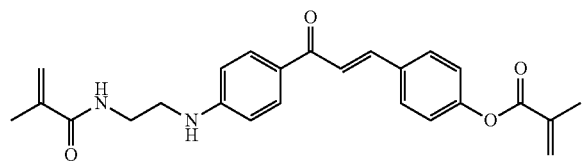
[Chem. 5]
(I-7)
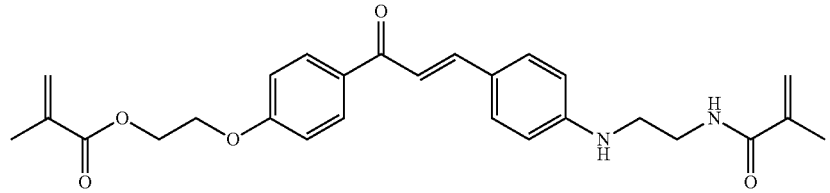
(I-8)
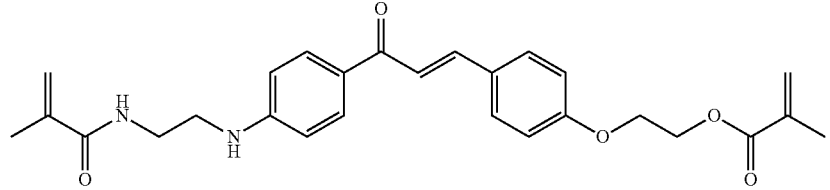
(I-9)
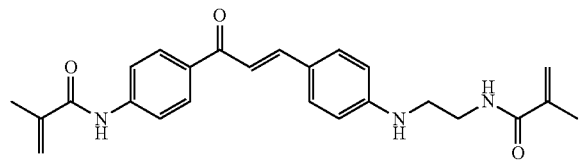
(I-10)
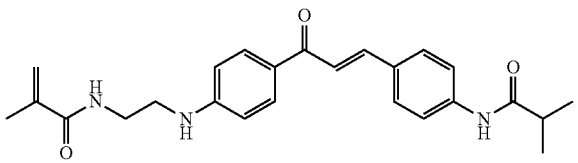
(I-11)
(I-12)
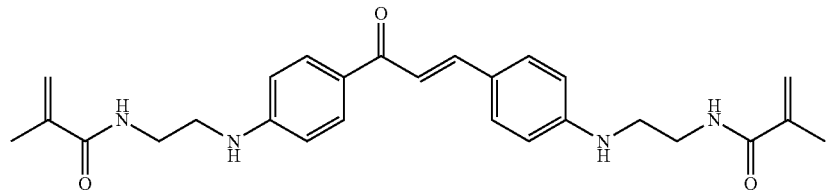

Other specific examples of the monomers represented by the formula (I) include those represented by the following formula (I-13), (I-14), (I-15), (I-16), or (I-17).

[Chem. 6]

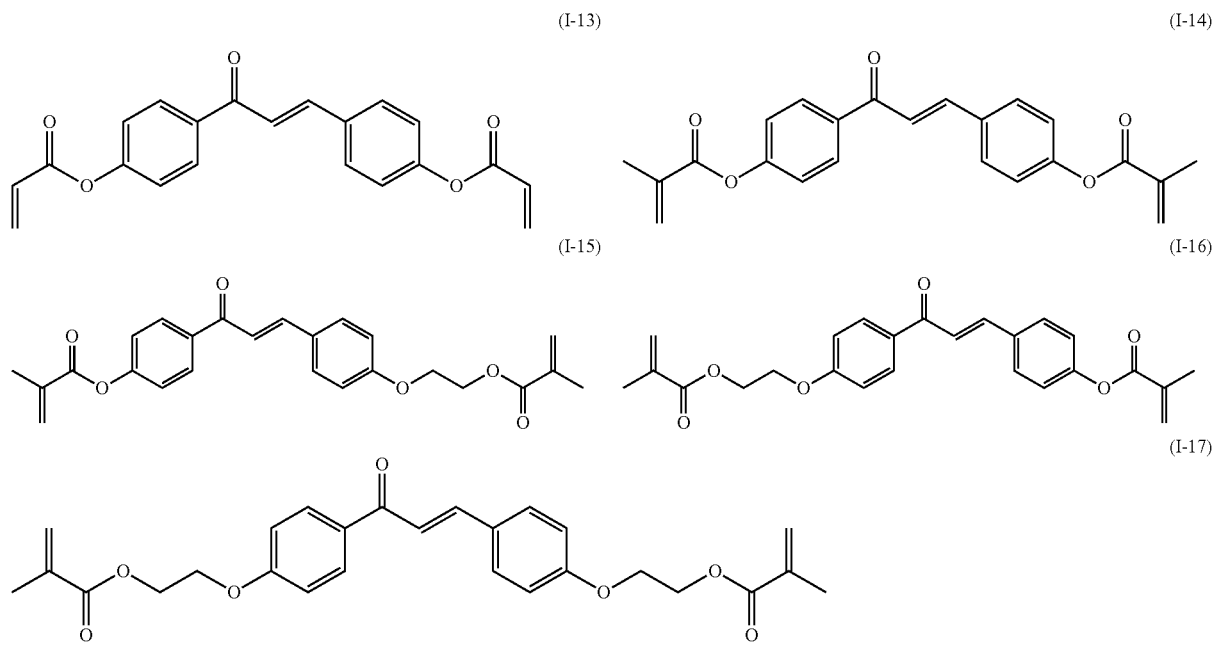

The retardation of the in-cell retardation layer 23 is defined by the product of the birefringence Δn of the polymer constituting the in-cell retardation layer 23 and the thickness d of the in-cell retardation layer 23. The in-cell retardation layer 23 may have any retardation. Preferably, the in-cell retardation layer 23 is one (λ/4 plate) giving an in-plane retardation of ¼ wavelength to light at a wavelength of 550 nm, specifically preferably one giving an in-plane retardation of 100 nm or higher and 176 nm or lower to at least light at a wavelength of 550 nm. A combination of the first linear polarizer 11 and a λ/4 plate functions as a circular polarizer. This can reduce internal reflection in the liquid crystal panel, thereby achieving good black display with reduced reflection of external light and significantly improving the visibility of a displayed image especially when used outside.

Figure 2:
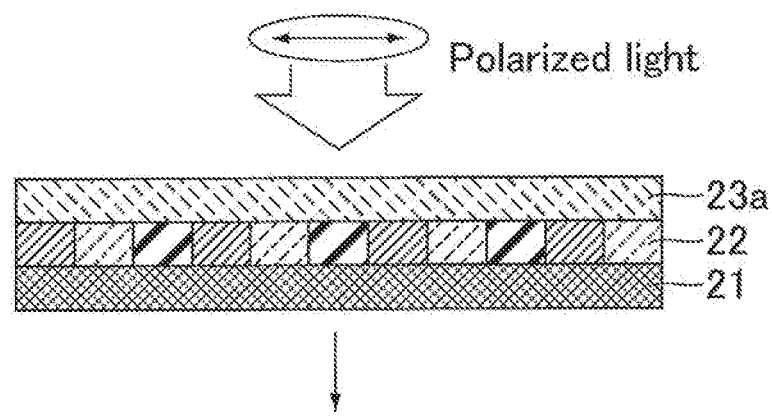
FIG. 2 includes diagrams illustrating a method for forming an in-cell retardation layer 23 using a photo-aligning monomer.
Figure 2:
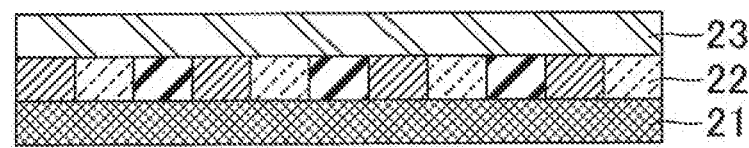

FIG. 2 includes diagrams illustrating a method for forming the in-cell retardation layer 23 using a photo-aligning monomer. As illustrated in FIG. 2(a), a film 23a containing a photo-aligning monomer is formed on the color filter/black matrix layer 22, and then the film 23a is heated up to a temperature not lower than the nematic-isotropic phase transition temperature $T_{NI}$ of the photo-aligning monomer and irradiated with polarized UV. This can polarize and align the photo-aligning monomer in the film 23a. The film 23a is thereby cured to provide the in-cell retardation layer 23, as illustrated in FIG. 2(b). If necessary, the film 23a after irradiated with polarized UV may be heated for removal of a solvent or completion of the polymerization of the photo-aligning monomer.

Examples of the solvent used in application of the photo-aligning monomer include toluene, ethylbenzene, ethylene glycol monomethyl ether, ethylene glycol dimethyl ether, propylene glycol methyl ether, dibutyl ether, acetone, methyl ethyl ketone, ethanol, propanol, cyclohexane, cyclopentanone, methylcyclohexane, tetrahydrofuran, dioxane, cyclohexanone, n-hexane, ethyl acetate, butyl acetate, propylene glycol monomethyl ether acetate (PKGMKA), methoxybutyl acetate, N-methylpyrrolidone, and dimethyl acetamide. These may be used alone or may be used in combination of two or more.

After the in-cell retardation layer 23 is formed by irradiating the photo-aligning monomer with polarized UV, a surface of the in-cell retardation layer 23 may directly be rubbed so as to exhibit an alignment regulating force on liquid crystal molecules of the liquid crystal layer 30. The in-cell retardation layer 23 is uniformly aligned by polarized UV irradiation not only on the surface alone but also in the whole layer. Thus, even when a surface of the in-cell retardation layer 23 is rubbed with rubbing cloth, no reduction in retardation is caused by disturbance of the alignment of the in-cell retardation layer 23. The rubbing direction for inducing the alignment of the liquid crystal layer 30 is preferably 45° relative to the slow axis of the in-cell retardation layer 23.

The liquid crystal material contained in the liquid crystal layer 30 may be, but is not limited to, a liquid crystal material that is horizontally aligned when no voltage is applied. The liquid crystal molecules in the liquid crystal layer 30 are horizontally aligned in a predetermined azimuth by the regulating forces of the in-cell retardation layer 23 and the alignment film 41 when no voltage is applied to the electrodes provided on the TFT substrate 42 (no-voltage-applied state), while they are rotated in an in-plane direction in accordance with a transverse electric field generated in the liquid crystal layer 30 when a voltage is applied to the electrodes (voltage-applied state).

The alignment film 41 may be an alignment film of polyimide, for example, that is common in the field of liquid crystal display panels. The alignment, treatment for the alignment, film 41 may be rubbing or light irradiation, for example.

The thin-film transistor (TFT) substrate 42 may be an active matrix substrate that is common in the field of liquid crystal display panels. When the liquid crystal driving mode of the liquid crystal display device in the present embodiment is a fringe field switching (FFS) mode, the TFT substrate 42 may include, for example, a support substrate, a common electrode (planar electrode) provided on the liquid crystal layer 30 side surface of the support substrate, an insulating film covering the common electrode, and a pixel electrode (comb-shaped electrode) provided on the liquid crystal layer 30 side surface of the insulating film. This structure can generate a transverse electric field (fringe electric field) in the liquid crystal layer 30 by applying voltage between the common electrode and the pixel electrode that constitute a pair of electrodes. Accordingly, adjusting the voltage applied between the common electrode and the pixel electrode enables control of the alignment of the liquid crystal in the liquid crystal layer 30. When the liquid crystal driving mode of the liquid crystal display device in the present embodiment is an in-plane switching (IPS) mode, applying a voltage to the paired comb-shaped electrodes provided on the TFT substrate 42 can generate a transverse electric field in the liquid crystal layer 30, enabling control of the alignment of the liquid crystal in the liquid crystal layer 30.

The second linear polarizer 51 may be the same as the first linear polarizer 11. The transmission axis of the first linear polarizer 11 and the transmission axis of the second linear polarizer 51 are preferably perpendicular to each other. In this structure, the first linear polarizer 11 and the second linear polarizer 51 are arranged in crossed Nicols, enabling good black display when no voltage is applied. In the description, the phrase "two axes (directions) are perpendicular to each other" and the like mean that the angle (absolute value) formed therebetween is 90±3°, preferably 90±1°, more preferably 90±0.5°, particularly preferably 90° (they are completely perpendicular to each other).

The backlight 60 may be of any type, such as an edge-lit type or a direct-lit type. The backlight 60 may include any light source, such as a light emitting diode (LED) or a cold cathode fluorescent lamp (CCFL). The light emitted from the backlight 60 is affected by voltage applied to the liquid crystal layer 30 in the liquid crystal display panel, so that the amount of light passing through the liquid crystal panel is controlled.

The liquid crystal display device of Embodiment 1 may include any other component. For example, the liquid crystal display device may be provided with an anti-reflection film on the viewing side of the first linear polarizer 11. This can further reduce the reflectance of the liquid crystal panel. The anti-reflection film may preferably be a moth-eye film having a moth-eye-like surface structure.

As described above, in Embodiment 1, the RM monomer itself constituting the in-cell retardation layer 23 can induce alignment. Thus, the whole in-cell retardation layer 23 is aligned. The RM monomer having such a function is preferably a monomer containing a chalconyl group represented by the above formula (I). A chalconyl group absorbs polarized UV to be aligned, which can eliminate the need for formation of an alignment layer for aligning the RM monomer. Alignment of the whole in-cell retardation layer 23 can improve the alignment stability against heat, reducing impairment of the alignment due to heat, i.e., impairment of the retardation. Further, such alignment can lead to good alignment of the mesogen site in the in-cell retardation layer 23, reducing impairment of the contrast ratio due to scattering.

Embodiment 2

Figure 3:
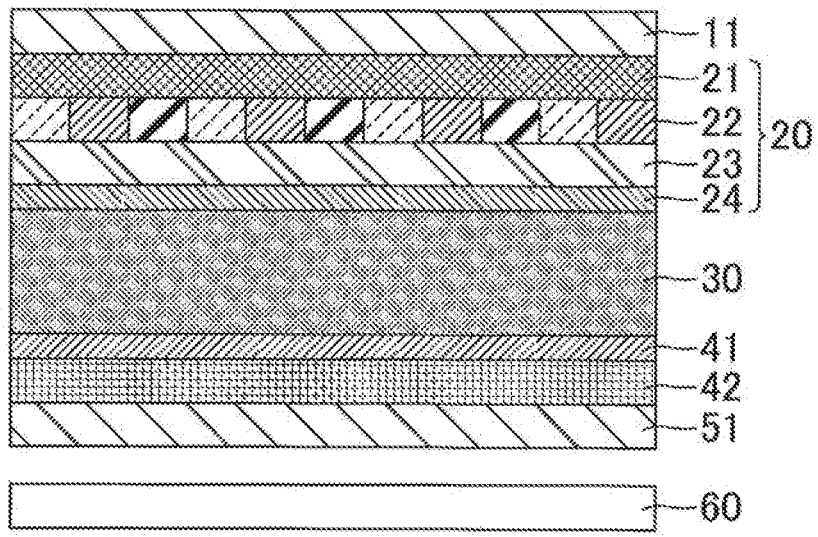
FIG. 3 is a schematic cross-sectional view of a structure of a liquid crystal display device of Embodiment 2.
Figure 4:
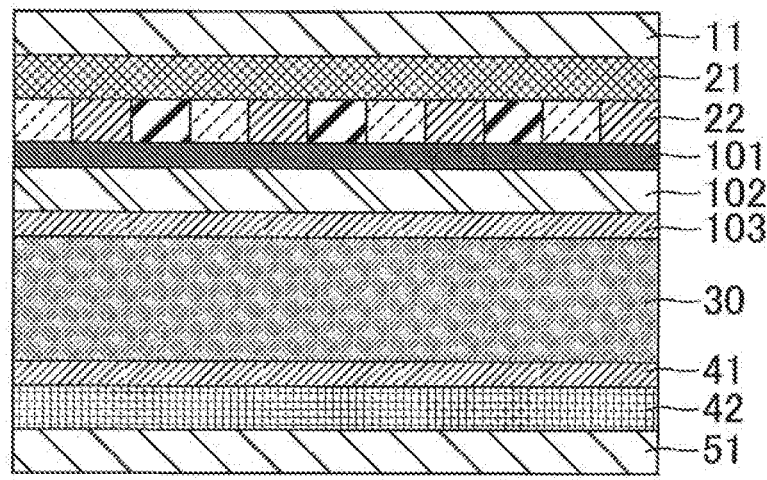
FIG. 4 is a schematic cross-sectional view of an exemplary structure of a liquid crystal panel including a retardation layer formed by a conventional method using an alignment layer.
Figure 5:
FIG. 5 includes diagrams illustrating a method for forming an in-cell retardation layer 102 using an alignment layer 101.
Figure 5:
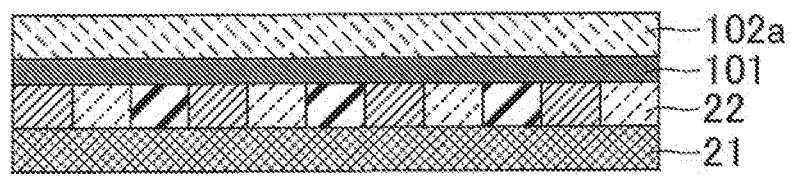
Figure 5:
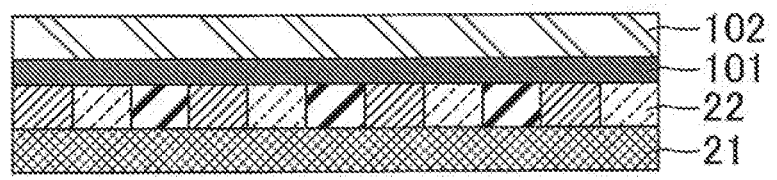

FIG. 3 is a schematic cross-sectional view of a structure of a liquid crystal display device of Embodiment 2. As illustrated in FIG. 3, the liquid crystal display device of Embodiment 2 includes, from the viewing side to the back side, the first linear polarizer 11, the color filter (CF) substrate 20, the liquid crystal layer 30, the alignment film 41, the thin-film transistor (TFT) substrate 42, the second linear polarizer 51, and the backlight 60.

The CF substrate 20 includes, from the viewing side to the back side, the transparent, substrate 21, the color filter/black matrix layer 22, the in-cell retardation layer 23, and a photo-alignment film 24. In the present embodiment, the photo-alignment film 24 provided on the liquid crystal layer 30 side of the in-cell retardation layer 23 can improve the alignment of the liquid crystal layer 30. This can improve the contrast ratio of the liquid crystal display device.

The photo-alignment, film 24 may be any one that exerts a function of controlling the alignment of liquid crystal molecules in the liquid crystal layer 30 by light, irradiation, and is formed from a photo-aligning material. The photo-aligning material means a material that changes in structure as a result of irradiation with light (magnetic waves) such as ultraviolet light or visible light, to exhibit, an ability (alignment regulating force) to control the alignment, of nearby liquid crystal molecules or a material that changes in magnitude and/or direction of the alignment, regulating force.

Examples of the photo-aligning material include those containing a photo-reactive site (photo-functional group) that is to cause a reaction such as dimerization (dimer formation), isomerization, photo-Fries rearrangement, or decomposition by light irradiation. Examples of photo-reactive sites to be dimerized and isomerized by light irradiation include cinnamate, chalcone, cumarin, and stilbene. An example of a photo-reactive site to be isomerized by light irradiation is azobenzene. An example of a photo-reactive site to be photo-Fries rearranged by light, irradiation is a phenol ester structure. An example of a photo-reactive site (photo-decomposable functional group) to be decomposed by light irradiation is a cyclobutane ring.

In the case of forming the in-cell retardation layer 23 from a monomer containing a chalconyl group, the photo-alignment film 24 is preferably formed from an alignment film material containing a photo-decomposable functional group or a cinnamate group. The center wavelength of light absorption by the photo-decomposable functional group is 250 nm and the center wavelength of light absorption by the cinnamate group is 310 nm, while the center wavelength of light absorption by the chalconyl group is 365 nm. Thus, the use of an alignment film material containing a photo-decomposable functional group or a cinnamate group can prevent the wavelength of light used in an alignment treatment on the photo-alignment film 24 from overlapping the light absorption wavelength of the RM monomer of the in-cell retardation layer 23.

A specific method for forming the photo-alignment, film 24 from an alignment film material containing a cyclobutane ring may be a method including forming a polymer film containing a cyclobutane ring on the in-cell retardation layer 23 and irradiating the polymer film with polarized light to generate an alignment regulating force on the liquid crystal molecules in the liquid crystal layer 30.

A specific method for forming the photo-alignment film 24 from an alignment film material containing a cinnamate group may be a method including forming a polymer film containing a cinnamate group on the in-cell retardation layer 23 and irradiating the polymer film with polarized light to generate an alignment regulating force on the liquid crystal molecules in the liquid crystal layer 30.

In Embodiments 1 and only the CF substrate 20 includes the in-cell retardation layer 23 formed from a photo-aligning monomer. Still, a retardation layer formed from a photo-aligning monomer may be present in any substrate in the present invention. Such a retardation layer may be present in the TFT substrate 42, or may be present in each of the CF substrate 20 and the TFT substrate 42.

The present, invention is described in detail below with reference to examples and comparative examples. Still, the present invention is not intended to be limited by these examples.

Example 1

In Example 1, the liquid crystal display device of Embodiment 1 was actually produced by the following method.

(Formation of Retardation Layer on CF Substrate)

First, a compound represented by the following formula (1) as a reactive mesogen (RM) material was dissolved in a propylene glycol monomethyl ether acetate (PEGMEA) solvent to prepare a 10 wt % solution. Then, the solution was applied to a CF substrate using a spin coater and pre-baked on a 140° C. electric griddle for one minute. The CF substrate includes an in-cell retardation layer as a component, thereof. Still, in the context of retardation layer formation in the examples, a stack of a transparent substrate and a color filter/black matrix layer is also referred to as a CF substrate. Then, the solution was irradiated with 5 J/cm$^2$ of polarized UV having a center wavelength of 365 nm so that, the RM material was polymerized simultaneously with an alignment treatment. Thereby, a RM retardation layer was formed. Finally, the workpiece was post-baked at 180° C. for 30 minutes, whereby the solvent was completely removed and the RM retardation layer was cured. The RM retardation layer had a thickness of 1 μm and a retardation of 135 nm.

[Chem. 7]

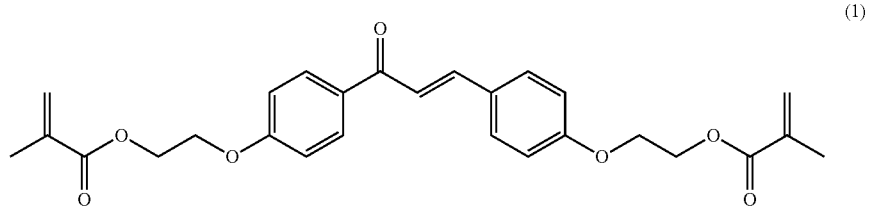

(1)

(Production of Liquid Crystal Display Device)

The CF substrate including the RM retardation layer and including no electrode and a FFS-mode TFT substrate including a pixel electrode and a common electrode were prepared. Then, a polyimide-based rubbing alignment film was formed only on the TFT substrate. The polyimide-based rubbing alignment film of the TFT substrate and the RM retardation layer of the CF substrate were each subjected to a rubbing treatment such that antiparallel alignments were achieved. The rubbing treatment, on the RM retardation layer was performed in the direction forming an angle of 45° relative to the slow axis of the RM retardation layer.

A sealant was applied to the TFT substrate in a predetermined pattern. The sealant used was a material curable by both UV light and heat. Then, liquid crystal ($T_{NI}$=90° C.) having positive anisotropy of dielectric constant was dropped on the TFT substrate, and the CF substrate including the RM retardation layer was attached thereto. Then, the temperature of the liquid crystal cell was set to 100° C. that, was higher than $T_{NI}$ so that a re-alignment treatment was performed. Thereby, a FFS-mode liquid crystal display device including the RM retardation layer in the cell was completed.

Example 2

A FFS-mode liquid crystal display device including a RM retardation layer in the cell was completed as in Example 1, except that the RM material used was changed from the compound represented by the formula (1) to a compound represented by the following formula (2) in the same amount.

[Chem. 8]

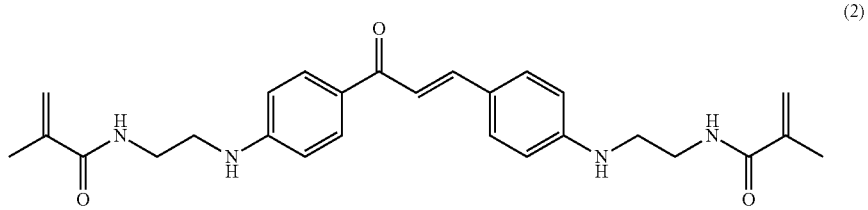

(2)

Example 3

A FFS-mode liquid crystal display device including a RM retardation layer in the cell was completed as in Example 1, except that the RM material used was changed from the compound represented by the formula (1) to a compound represented by the following formula (3) in the same amount.

[Chem. 9]

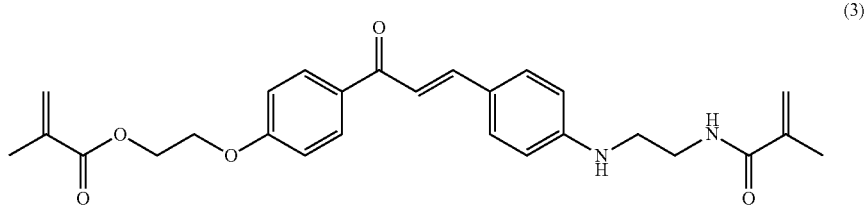

(3)

Comparative Example 1

A compound represented by the following formula (4) as a reactive mesogen (RM) material was dissolved in a propylene glycol monomethyl ether acetate (PEGMEA) solvent to prepare a 10 wt. % solution. Then, a polyimide alignment film was formed on a CF substrate and subjected to a rubbing treatment. The solution was applied to the CF substrate using a spin coater and pre-baked on a 140° C. electric griddle for one minute. Then, the solution was irradiated with 5 J/cm$^2$ of non-polarized UV having a center wavelength of 365 nm and post-baked at 160° C. for 30 minutes so that the solvent was completely removed simultaneously with polymerization of the RM material. Thereby, a RM retardation layer was formed. The RM retardation layer had a thickness of 1 μm and a retardation value (retardation) of 135 nm. Except that the resulting CF substrate including the RM retardation layer was used, a FFS-mode liquid crystal display device including the RM retardation layer in the cell was completed as in Example 1.

Comparative Example 2

A FFS-mode liquid crystal display device including no RM retardation layer in the cell was completed as in Example 1, except that, no RM retardation layer was formed on the CF substrate.

<Evaluation Tests>

The liquid crystal display devices of Examples 1 to 3 and Comparative Examples 1 and 2 were subjected to the following tests (1) to (3). The results are shown in the following Table 1.

(1) Heat Resistance Test of RM Retardation Layer

The retardation was measured before and after 30-minute baking on a 200° C. electric griddle. The retardation was measured by ellipsometry.

(2) Darkroom Contrast, Ratio

The darkroom contrast, ratio of each liquid crystal display device produced was measured in a dark place using a luminance meter "Topcon BM5" available from Topcon Technohouse Corp.

(3) Outdoor Visibility Test

The display area of each liquid crystal display device produced was divided into eight equal sections (either in vertical direction or horizontal direction). The divided sections were made to display at the respective gray scale values from 0 to 255 gray scale values at intervals of 32 gray scale values (gray scale value 0, gray scale value 32, gray

[Chem. 10]

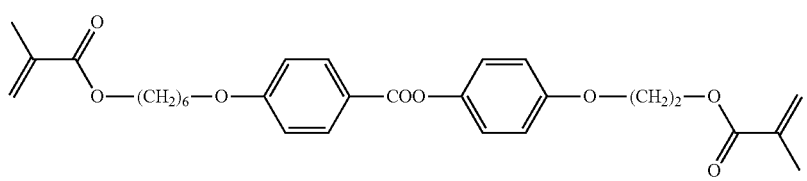

(4)

scale value 64, gray scale value 96, gray scale value 128, gray scale value 160, gray scale value 192, gray scale value 224, and gray scale value 255), and were observed outside on a sunny day. The outdoor visibility was evaluated as "good" when the differences of the gray scale values were recognized, while the outdoor visibility was evaluated as "poor" when the differences of the gray scale values were not recognized.

TABLE 1

|  | RM material | Retardation of retardation layer (nm) | | Liquid crystal display device | |
|---|---|---|---|---|---|
|  |  | Before baking | After 30-minute baking | Darkroom contrast ratio | Outdoor visibility |
| Example 1 | Formula (1) | 135 | 125 | 610 | Good |
| Example 2 | Formula (2) | 135 | 135 | 634 | Good |
| Example 3 | Formula (3) | 135 | 135 | 630 | Good |
| Comparative Example 1 | Formula (4) | 135 | 105 | 480 | Good |
| Comparative Example 2 | None | None | | 800 | Poor |

The RM retardation layers of Examples 1 to 3 produced using the compound of the formula (1), (2), or (3) as a RM material exhibited a small reduction in retardation even after the heat treatment at 200° C. for 30 minutes. The retardation layer of Comparative Example 1 produced using the compound of the formula (4) on the polyimide alignment film exhibited a large reduction in retardation after the heat treatment at 200° C. for 30 minutes. For the compounds of the formula (1), (2), or (3), the RM material itself absorbs polarized UV to be aligned. This seems to have led to uniform alignment in the whole thickness of the retardation layer and a small reduction in retardation due to heating. Further, for the compound of the formula (2) and the compound of the formula (3), the presence of an amino group and an amide group can lead to formation of many hydrogen bond sites. This seems to have led to high thermal stability of the retardation layer.

The liquid crystal display devices of Examples 1 to 3 and Comparative Example 1 in each of which the retardation layer was formed using the compound of the formula (1), (2), (3), or (4) as a RM material exhibited good outdoor visibility. The use of the compound of the formula (1), (2), or (3) led to a small reduction in contrast ratio due to scattering on the retardation layer.

Example 4

In Example 4, the liquid crystal display device of Embodiment 2 was actually produced by the following method.

(Formation of Retardation Layer on CF Substrate)

First, a compound represented by the following formula (5) as a RM material was dissolved in a propylene glycol monomethyl ether acetate (PEGMFA) solvent to prepare a 10 wt % solution. Then, the solution was applied to a CF substrate using a spin coater and pre-baked on a 140° C. electric griddle for one minute. Then, the solution was irradiated with 5 J/cm$^2$ of polarized UV having a center wavelength of 365 nm so that, the RM material was polymerized simultaneously with an alignment treatment. Thereby, a RM retardation layer was formed. Finally, the workpiece was post-baked at 180° C. for 30 minutes, whereby the solvent was completely removed and the RM retardation layer was cured. The RM retardation layer had a thickness of 1 μm and a retardation of 135 nm.

[Chem. 11]

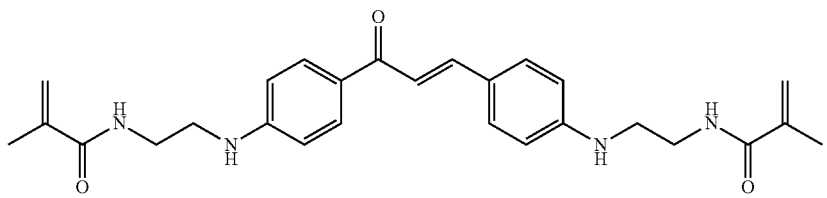

(5)

(Production of Liquid Crystal Display Device)

The CF substrate including the RM retardation layer and including no electrode and a FFS-mode TFT substrate including a pixel electrode and a common electrode were prepared. Then, an alignment film containing a polymer that contains a cinnamate group represented by the following formula (6) was formed on each substrate. Then, the alignment films on the respective substrates were each subjected to a photo-alignment treatment such that antiparallel alignments were achieved. In the photo-alignment treatment, polarized UV at a wavelength of 260 to 330 nm was applied using a cut filter. The photo-alignment treatment, on the RM retardation layer was performed in the direction forming an angle of 45° relative to the slow axis of the RM retardation layer.

[Chem. 12]

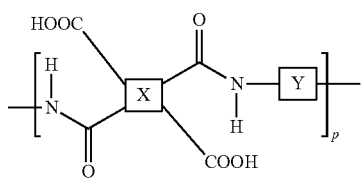

(6)

-continued

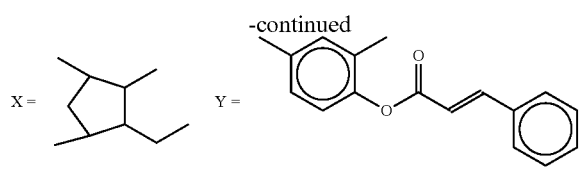

In the formula, p represents the degree of polymerization.

A sealant was applied to the TFT substrate in a predetermined pattern. The sealant, used was a material curable by both UV light and heat. Then, liquid crystal ($T_{NI}$=90° C.) having positive anisotropy of dielectric constant was dropped on the TFT substrate, and the CF substrate including the RM retardation layer was attached thereto. Then, the temperature of the liquid crystal cell was set to 100° C. that was higher than so that a re-alignment treatment was performed. Thereby, a FFS-mode liquid crystal display device including the RM retardation layer in the cell was completed.

Example 5

A FFS-mode liquid crystal display device including a RM retardation layer in the cell was completed as in Example 4, except that the alignment film containing the polymer that contains a cinnamate group represented by the formula (6) was changed to a polyimide-based rubbing alignment film.

Comparative Example 3

A FFS-mode liquid crystal display device including an alignment film containing a polymer that contains a cinnamate group represented by the formula (6) in the cell but including no RM retardation layer was completed as in Example 4, except that no RM retardation layer was formed on the CF substrate.

<Evaluation Tests>

The liquid crystal display devices of Examples 4 and 5 and Comparative Example 3 were subjected to the above 5 tests (1) to (3). The results are shown in the following

TABLE 2

|  | RM material | Alignment film | Retardation of retardation layer (nm) | | Liquid crystal display device | |
| --- | --- | --- | --- | --- | --- | --- |
|  |  |  | Before baking | After 30-minute baking | Darkroom contrast ratio | Outdoor visibility |
| Example 4 | Formula (5) | Formula (6) | 135 | 135 | 730 | Good |
| Example 5 | Formula (5) | Rubbing alignment film | 135 | 135 | 620 | Good |
| Comparative Example 3 | None | Formula (6) | None | | 900 | Poor |

The RM retardation layers of Examples 4 and 5 produced using the compound of the formula (5) as a RM material exhibited no reduction in retardation even after the heat treatment at 200° C. for 30 minutes. For the compound of the formula (5), the RM material itself has an aligning ability so that the whole retardation layer is uniformly aligned, and the presence of an amino group and an amide group can lead to formation of many hydrogen bond sites. This seems to have led to high thermal stability of the retardation layer.

The liquid crystal display device of Example A in which the retardation layer was formed using the compound of the formula (5) as a RM Material and in which the photo-alignment film used therefor contained a cinnamate group represented by the formula (6) exhibited a higher contrast ratio and better outdoor visibility than the liquid crystal display device of Example 5 in which a rubbing alignment film was used. The causes of a high contrast ratio seem to be less scattering on the retardation layer and the use of a photo-alignment, film.

Example 6

In Example 6, the liquid crystal display device of Embodiment 2 was actually produced by the following method.

(Formation of Retardation Layer on CF Substrate)

First, a compound represented by the following formula (7) as a RM material was dissolved in a propylene glycol monomethyl ether acetate (PEGMEA) solvent to prepare a 10 wt % solution. Then, the solution was applied to a CF substrate using a spin coater and pre-baked on a 140° C. electric griddle for one minute. Then, the solution was irradiated with 5 J/cm² of polarized UV having a center wavelength of 365 nm so that the RM material was polymerized simultaneously with an alignment treatment. Thereby, a RM retardation layer was formed. Finally, the workpiece was post-baked at 180° C. for 30 minutes, whereby the solvent was completely removed and the RM retardation layer was cured. The RM retardation layer had a thickness of 1 μm and a retardation of 135 nm.

[Chem. 13]

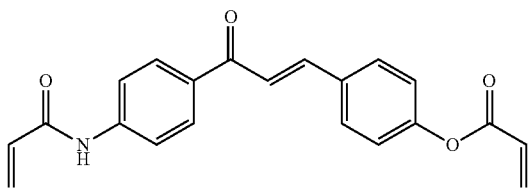

(7)

(Production of Liquid Crystal Display Device)

The CF substrate including the RM retardation layer and including no electrode and a FFS-mode TFT substrate including a pixel electrode and a common electrode were prepared. Then, an alignment film containing a polymer that contains a cyclobutane ring represented by the following formula (8) was formed on each substrate. In the photo-alignment, treatment, polarized UV at a wavelength of 300 nm or shorter was applied using a cut filter. Then, the alignment films on the respective substrates were each subjected to a photo-alignment treatment such that antiparallel alignments were achieved. The photo-alignment treatment on the RM retardation layer was performed in the direction forming an angle of 45° relative to the slow axis of the RM retardation layer.

[Chem. 14]

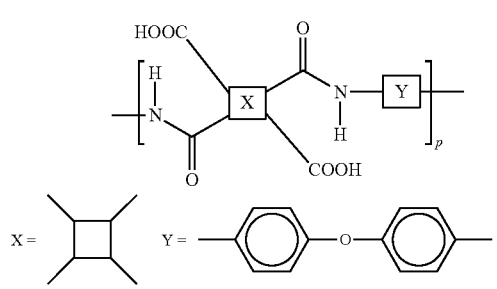

(8)

In the formula, p represents the degree of polymerization.

A sealant was applied to the TFT substrate in a predetermined pattern. The sealant used was a material curable by both UV light and heat. Then, liquid crystal ($T_{NI}$=80° C.) having negative anisotropy of dielectric constant was dropped on the TFT substrate, and the CF substrate including the RM retardation layer was attached thereto. Then, the temperature of the liquid crystal cell was set to 100° C. that, was higher than $T_{NI}$ so that a re-alignment treatment was performed. Thereby, a FFS-mode liquid crystal display device including the RM retardation layer in the cell was completed.

Comparative Example 4

A FFS-mode liquid crystal display device including an alignment film containing a polymer that contains a cyclobutane ring represented by the formula (8) in the cell but including no RM retardation layer was completed as in Example 6, except that no RM retardation layer was formed on the CF substrate.

<Evaluation Tests>

The liquid crystal display devices of Example 6 and Comparative Example 4 were subjected to the above tests (1) to (3). The results are shown in the following Table 3.

TABLE 3

| | | Retardation of retardation layer (nm) | | Liquid crystal display device | |
| --- | --- | --- | --- | --- | --- |
| RM material | Alignment film | Before baking | After 30-minute baking | Darkroom contrast ratio | Outdoor visibility |
| Example 6 | Formula (7) | Formula (8) | 135 | 135 | 800 | Good |
| Comparative Example 4 | None | Formula (8) | None | | 1000 | Poor |

The RM retardation layer of Example 6 produced using the compound of the formula (7) as a RM material exhibited no reduction in retardation even after the heat treatment at 200° C. for 30 minutes. For the compound of the formula (7), the RM material itself has an aligning ability so that the whole retardation layer is uniformly aligned and the presence of an amino group and an amide group can lead to formation of many hydrogen bond sites. This seems to have led to high thermal stability of the retardation layer.

The liquid crystal display device of Example 6 in which the retardation layer was formed using the compound of the formula (7) as a RM material, in which the photo-alignment film used therefor contained a decomposable cyclobutane ring represented by the formula (8), and in which the liquid crystal material used therefor had negative anisotropy of dielectric constant exhibited a high contrast ratio of 800° r higher and good outdoor visibility. The causes of a high contrast ratio seem to be less scattering on the retardation layer, an improved transmittance owing to the use of a liquid crystal material having negative anisotropy of dielectric constant, and the use of a photo-alignment film.

(Additional Remarks)

An aspect of the present invention is a liquid crystal display device including: paired substrates; and a liquid crystal layer provided between the paired substrates at least one of the paired substrates including a retardation layer formed from a polymer of at least one type of monomer, the at least one type of monomer including a photo-aligning monomer that is to be aligned by polarized light.

The photo-aligning monomer is preferably one represented by the following formula (I):

[Chem. 15]

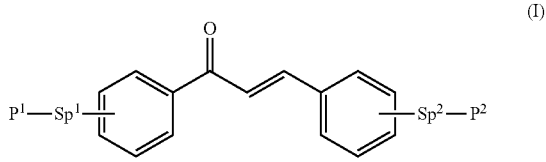

(I)

wherein $P^1$ and $P^2$ are the sane as or different from each other and are each an acryloyloxy group, a methacryloyloxy group, an acryloylamino group, a methacryloylamino group, a vinyl group, or a vinyloxy group; and $Sp^1$ and $Sp^2$ are the same as or different from each other, and are each a C1-C6 linear, branched, or cyclic alkylene group, a C1-C6 linear, branched, or cyclic alkyleneoxy group, a C1-C6 linear, branched, or cyclic alkyleneamino group, or a direct bond.

The photo-aligning monomer preferably contains at least one of an amide group and/or an amino group.

The photo-aligning monomer may be one represented by the following formula (I-1), (I-2), (I-3), (I-4), (I-5), (I-6), (I-7), (I-8), (I-9), (I-10), (I-11), or (I-12).

[Chem. 16]
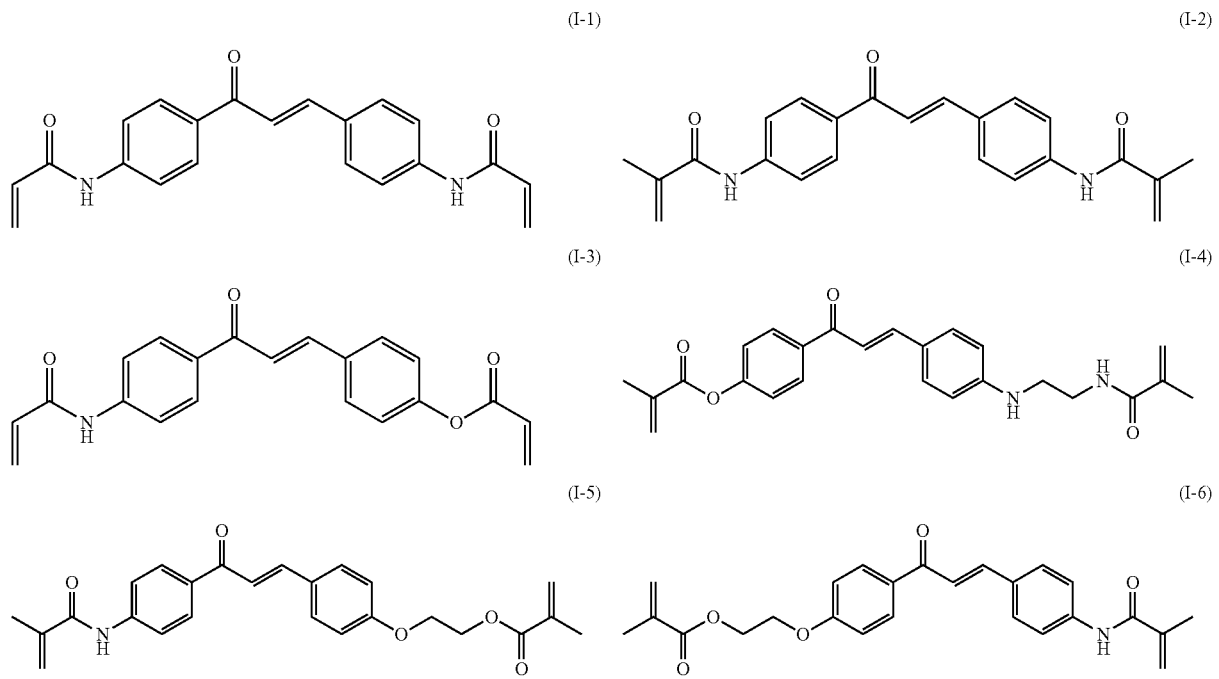
[Chem. 17]
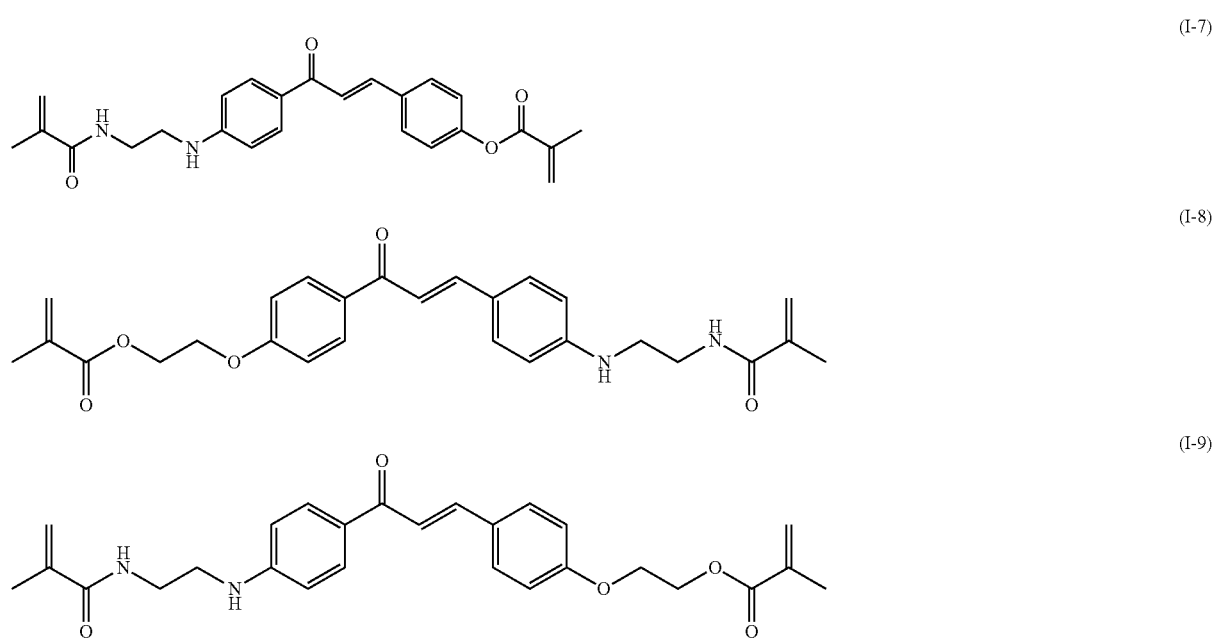

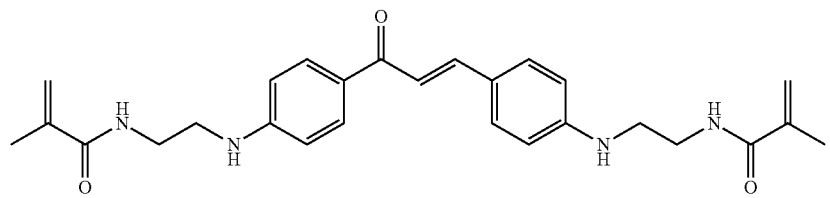
(I-12)

The liquid crystal display device may further include, between at least one of the paired substrates and the liquid crystal layer, a photo-alignment film that controls alignment, of liquid crystal molecules in the liquid crystal layer. The photo-alignment film may have a structure derived from a cyclobutane ring and may contain a cinnamate group.

Another aspect of the present, invention is a method for producing a liquid crystal display device that includes a liquid crystal layer and a substrate including a retardation layer, the method including: forming a film containing at least one type of monomer, the at least one type of monomer including a photo-aligning monomer represented by the following formula (I):

[Chem. 18]

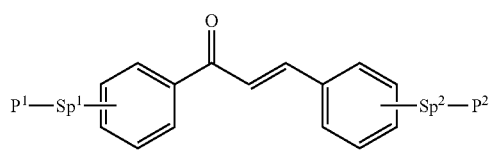
(I)

wherein $P^1$ and $P^2$ are the sane as or different from each other, and are each an acryloyloxy group, a methacryloyloxy group, an acryloylamino group, a methacryloylamino group, a vinyl group, or a vinyloxy group; and $Sp^1$ and $Sp^2$ are the same as or different from each other, and are each a C1-C6 linear, branched, or cyclic alkylene group, a C1-C6 linear, branched, or cyclic alkyleneoxy group, a C1-C6 linear, branched, or cyclic alkyleneamino group, or a direct bond; and irradiating the film with polarized light to polymerize and align the monomer to form the retardation layer.

The method for producing a liquid crystal display device may further include rubbing a surface of the retardation layer to allow the retardation layer to exhibit an alignment regulating force on liquid crystal molecules in the liquid crystal layer.

The method for producing a liquid crystal display device may further include: forming a polymer film containing a cinnamate group on the retardation layer; and irradiating the polymer film with polarized light to allow the polymer film to exhibit an alignment regulating force on liquid crystal molecules in the liquid crystal layer.

The method for producing a liquid crystal display device may further include: forming a polymer film containing a cyclobutane ring on the retardation layer; and irradiating the polymer film with polarized light to allow the polymer film to exhibit an alignment regulating force on liquid crystal molecules in the liquid crystal layer.

REFERENCE SIGNS LIST

11: first linear polarizer
20: color filter (CF) substrate
21: transparent substrate
22: color filter/black matrix layer
23: in-cell retardation layer
23a: film containing photo-aligning monomer
24: photo-alignment, film
30: liquid crystal layer
41: alignment film
42: thin-film transistor (TFT) substrate
51: second linear polarizer
60: backlight
101: alignment layer
102: in-cell retardation layer
102a: film containing reactive monomer
103: alignment film

The invention claimed is:
1. A liquid crystal display device comprising:
paired substrates; and
a liquid crystal layer provided between the paired substrates,
at least one of the paired substrates including a retardation layer formed from a polymer of at least one type of monomer,
the at least one type of monomer including a photo-aligning monomer that is to be aligned by polarized light,
wherein the photo-aligning monomer is represented by the following formula (I-1), (I-2), (I-3), (I-4), (I-5), (I-6), (I-7), (I-8), (I-9), (I-10), (I-11), or (I-12):

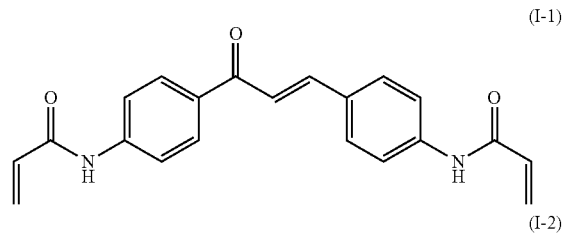
(I-1)

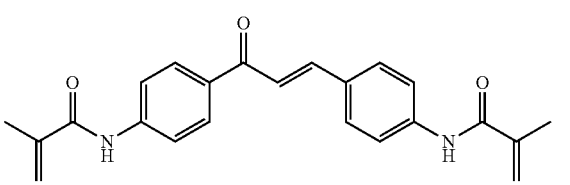
(I-2)

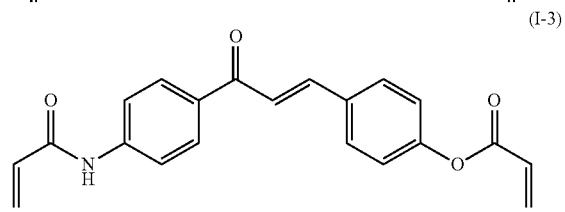
(I-3)

-continued (I-4)
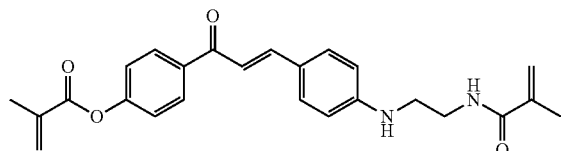

(I-5)
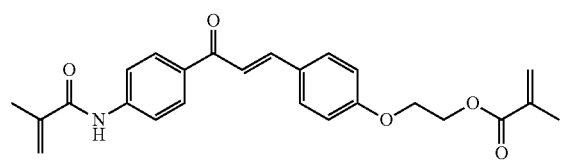

(I-6)
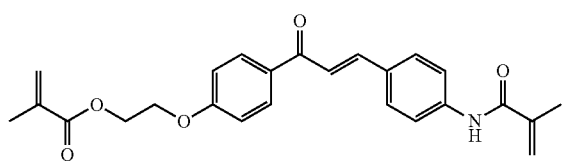

(I-7)
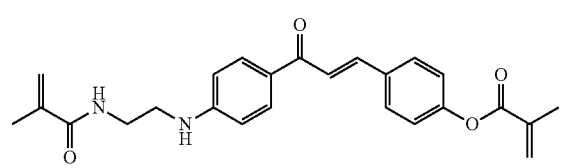

(I-8)
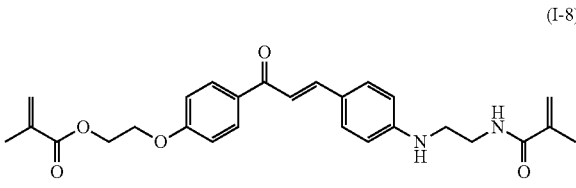

(I-9)
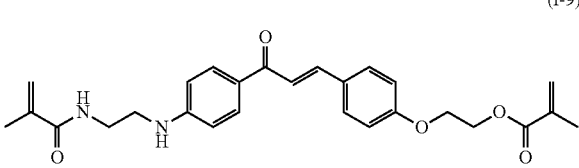

-continued (I-10)
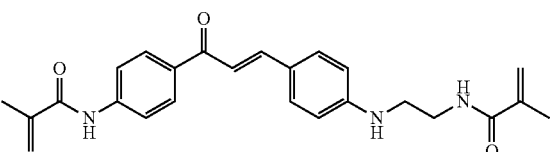

(I-11)
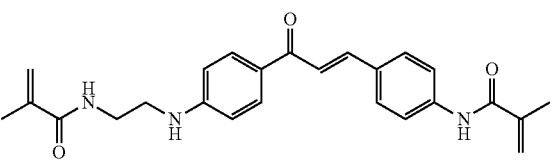

(I-12)
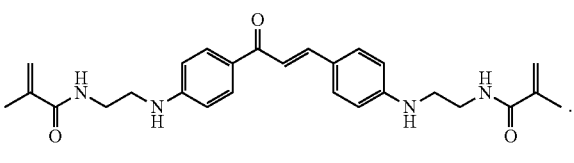

2. The liquid crystal display device according to claim 1, further comprising, between at least one of the paired substrates and the liquid crystal layer, a photo-alignment film that controls alignment of liquid crystal molecules in the liquid crystal layer.

3. The liquid crystal display device according to claim 2, wherein the photo-alignment film has a structure derived from a cyclobutane ring.

4. The liquid crystal display device according to claim 2, wherein the photo-alignment film contains a cinnamate group.

5. A method for producing a liquid crystal display device according to claim 1 that includes a liquid crystal layer and a substrate including a retardation layer, the method comprising:

forming a film containing at least one type of monomer, the at least one type of monomer including a photo-aligning monomer represented by the following formula (I-1), (I-2), (I-3), (I-4), or (I-12):

[Chem. 2]

(I-1)
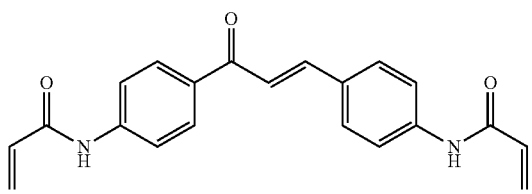

(I-2)
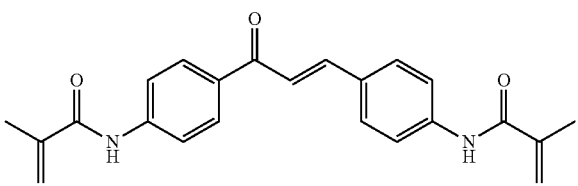

(I-3)
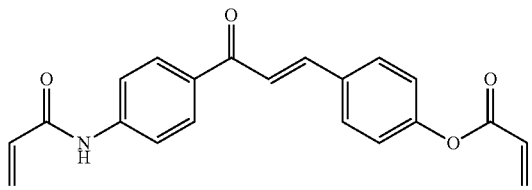

(I-4)
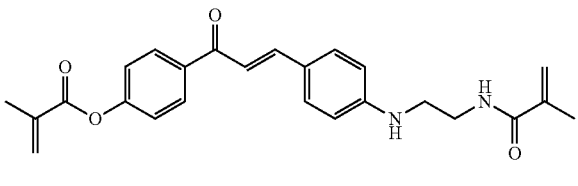

-continued (I-5)
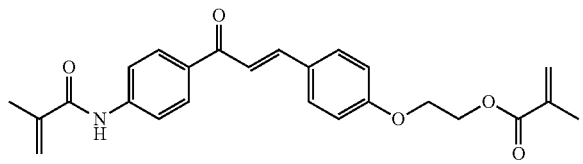

(I-6)
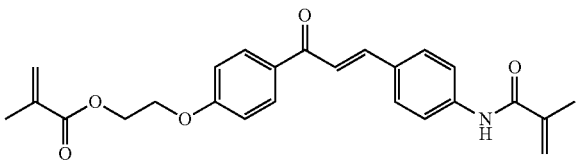

[Chem. 3]

(I-7)
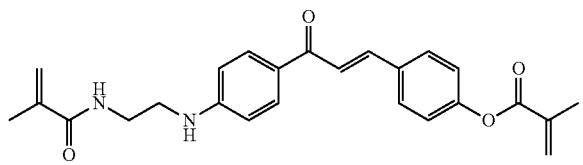

(I-8)
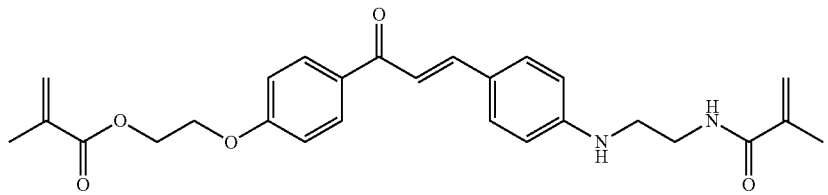

(I-9)
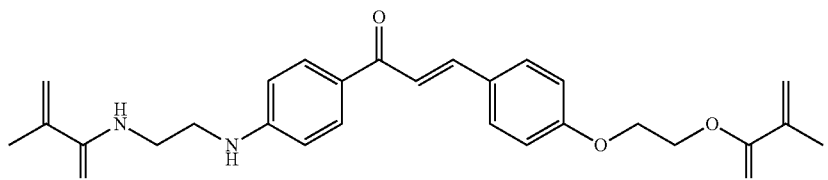

(I-10)
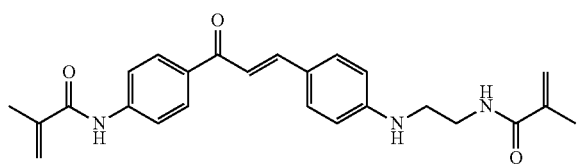

(I-11)
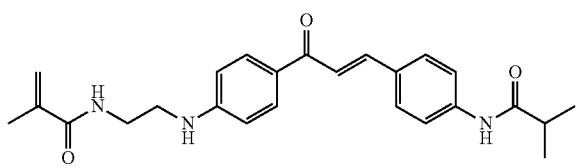

(I-12)
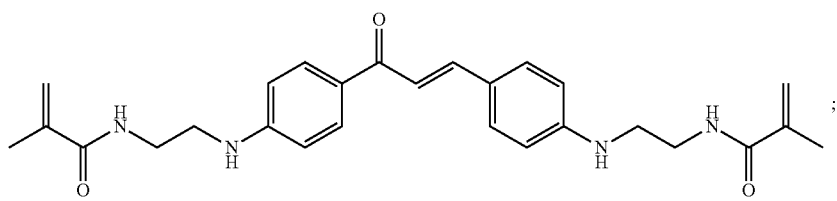

;

and
- irradiating the film with polarized light to polymerize and align the monomer to form the retardation layer.

6. The method for producing a liquid crystal display device according to claim 5, further comprising
- rubbing a surface of the retardation layer to allow the retardation layer to exhibit an alignment regulating force on liquid crystal molecules in the liquid crystal layer.

7. The method for producing a liquid crystal display device according to claim 5, further comprising:
- forming a polymer film containing a cinnamate group on the retardation layer; and
- irradiating the polymer film with polarized light to allow the polymer film to exhibit an alignment regulating force on liquid crystal molecules in the liquid crystal layer.

8. The method for producing a liquid crystal display device according to claim 5, further comprising:
- forming a polymer film containing a cyclobutane ring on the retardation layer; and
- irradiating the polymer film with polarized light to allow the polymer film to exhibit an alignment regulating force on liquid crystal molecules in the liquid crystal layer.

* * * * *